United States Patent
Gecer et al.

(10) Patent No.: US 9,332,055 B2
(45) Date of Patent: May 3, 2016

(54) METHOD AND APPARATUS FOR ROUTING XCAP REQUESTS

(75) Inventors: Bulent Gecer, Saltsjo-Boo (SE); Mikael Klein, Huddinge (SE); Sofie Lassborn, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 138 days.

(21) Appl. No.: 13/576,588

(22) PCT Filed: Feb. 2, 2010

(86) PCT No.: PCT/SE2010/050114
§ 371 (c)(1),
(2), (4) Date: Aug. 1, 2012

(87) PCT Pub. No.: WO2011/096853
PCT Pub. Date: Aug. 11, 2011

(65) Prior Publication Data
US 2012/0297029 A1    Nov. 22, 2012

(51) Int. Cl.
*G06F 15/16*    (2006.01)
*H04L 29/08*    (2006.01)
(Continued)

(52) U.S. Cl.
CPC ............ *H04L 67/02* (2013.01); *H04L 67/1002* (2013.01); *H04L 67/1008* (2013.01); *H04L 67/1014* (2013.01); *H04L 67/24* (2013.01); *H04L 67/2804* (2013.01);
(Continued)

(58) Field of Classification Search
None
See application file for complete search history.

(56) References Cited

U.S. PATENT DOCUMENTS 7,324,505 B2 *   1/2008   Hoover ............... H04M 3/2218
                                                    370/352
8,543,719 B2 *   9/2013   Oh .......................... H04W 4/00
                                                    455/301
(Continued)

FOREIGN PATENT DOCUMENTS

CN       101552801 A       10/2009
EP        1845457 A1 *     10/2007   .............. G06F 17/30
(Continued)

OTHER PUBLICATIONS

Isomaki, M, Leppanen, E, "An Extensible Markup Language (XML) Configuration Access Protocol (XCAP) Usage for Manipulating Presence Document Contents."( IETF 2007, 11 pages).*
(Continued)

*Primary Examiner* — Ranodhi Serrao
*Assistant Examiner* — James Fiorillo
(74) *Attorney, Agent, or Firm* — Rothwell, Figg, Ernst & Manbeck, P.C.

(57) ABSTRACT

The present invention relates to methods and apparatuses for finding out which XDM server a specific user is allocated to in a network with several XDM servers. An HTTP proxy (120) receives an XCAP request (610) from an XDM client (100), including information related to a user associated with the XDM client. The HTTP proxy checks if the user exists in its storage (330), based on the received user information, and if not, the HTTP proxy creates a SIP request (630) including the user information, and passes it over to a SIP Proxy (130, 230). The SIP Proxy finds out which XDM server the user is allocated to by enquiring a subscriber database (140), and then the SIP proxy passes the XDM server address information back to the HTTP Proxy (640), which is then able to route the XCAP request (650) to the correct XDM server (150, 250).

13 Claims, 7 Drawing Sheets

(51) Int. Cl.
*G06F 17/30* (2006.01)
*G06F 17/22* (2006.01)
*G06Q 10/10* (2012.01)

(52) U.S. Cl.
CPC ...... *G06F 17/2247* (2013.01); *G06F 17/30587* (2013.01); *G06F 17/30861* (2013.01); *G06F 17/30908* (2013.01); *G06Q 10/10* (2013.01)

(56) References Cited

U.S. PATENT DOCUMENTS

| | | | | |
|---|---|---|---|---|
| 2006/0053208 | A1* | 3/2006 | Laurila et al. | H04W 4/08 709/206 |
| 2007/0189203 | A1* | 8/2007 | Sung et al. | H04W 4/10 370/328 |
| 2008/0046482 | A1* | 2/2008 | Oh et al. | G06F 17/30011 |
| 2008/0162709 | A1* | 7/2008 | Hrischuk et al. | H04L 67/1008 709/230 |
| 2008/0249997 | A1* | 10/2008 | Sun et al. | G06F 17/30587 |
| 2008/0256117 | A1* | 10/2008 | Laurila et al. | H04L 67/02 |
| 2008/0319948 | A1* | 12/2008 | Berg | G06F 17/30908 |
| 2009/0043847 | A1* | 2/2009 | Laurila | G06F 17/30861 709/204 |
| 2009/0106212 | A1* | 4/2009 | He | H04L 67/24 |
| 2009/0125803 | A1* | 5/2009 | Bao | G06F 17/30011 715/235 |
| 2009/0129388 | A1* | 5/2009 | Akhtar | H03M 7/30 370/392 |
| 2009/0157799 | A1* | 6/2009 | Sukumaran | G06Q 10/10 709/203 |
| 2010/0306361 | A1* | 12/2010 | Boberg | H04L 29/12113 709/223 |
| 2010/0325208 | A1* | 12/2010 | Chitturi | H04L 67/2804 709/204 |
| 2011/0191483 | A1* | 8/2011 | Zhu | H04L 65/104 709/228 |
| 2011/0289195 | A1* | 11/2011 | Lindgren | H04L 67/24 709/219 |
| 2012/0023079 | A1* | 1/2012 | Lee | G06F 17/2247 707/703 |
| 2013/0031257 | A1* | 1/2013 | Klein | H04L 65/1016 709/227 |

FOREIGN PATENT DOCUMENTS

| | | | | |
|---|---|---|---|---|
| EP | 1968263 | A1 | 9/2008 | |
| FI | 1845457 | A1 * | 10/2007 | ........ G06F 17/30011 |
| WO | 2009068114 | A1 | 6/2009 | |

OTHER PUBLICATIONS

Implementation Guidelines for OMA XDM V1.1—Open Moblile Alliance—Jun. 27, 2008.*
Open Mobile Alliance (OMA), "XML Document Management Architecture Candidate Version 2.1—Oct. 23, 2009", Open Mobile Alliance OMA-AD-XDM-V2_1-20091023-C, Sep. 23, 2009, pp. 1-36, XP002636071.
Chinese First Office Action issued in patent application No. 201080063011.4 dated Jun. 13, 2014, 27 pages.

* cited by examiner

METHOD AND APPARATUS FOR ROUTING XCAP REQUESTS

CROSS-REFERENCE TO RELATED APPLICATION

This application is a 35 U.S.C. § 371 National Phase Entry Application from PCT/SE2010/050114, filed Feb. 2, 2010, and designating the United States, the disclosure of which is incorporated by reference herein.

TECHNICAL FIELD

The present invention relates to methods and apparatuses for routing an XCAP request from an XDM client to an XDM server.

BACKGROUND

Extensible Markup Language (XML), has become a widespread file format for a large number of office-productivity tools, as well as for various types of Internet Protocol (IP) multimedia services, which may be distributed e.g. via the IP Multimedia Subsystem (IMS), or any other architectural framework which is adapted for delivery of IP multimedia services. The XML Configuration Access Protocol (XCAP) allows a device provided with XCAP Client functionality to read, write and modify application configuration data stored in XML format on a Server which is provided with XCAP Server functionality.

XML Document Management (XDM) is an Open Mobile Alliance (OMA) specification which enables XCAP Clients to access and manipulate XML documents stored on XCAP Servers. According to the OMA XDM standard, a Client having XCAP Client functionality may be referred to as an XDM Client (XDMC), while a corresponding Server may be referred to as an XDM Server (XDMS).

An Aggregation Proxy (AP) is the contact point for an XDMC to access XDM Resources stored in any XDMS. An AP is a Hypertext Transfer Protocol (HTTP) proxy that receives and routes individual XCAP requests to the correct XDMS or to a Cross-Network-Proxy, in case the XCAP request is related to an XDM Resource in a remote network. The AP may also perform authentication of the user behind the XDMC.

In communication networks with high loads of traffic, XDMS's may have to be scaled over several physical XDMS nodes. A user having an XDMC may accordingly be allocated to one of these XDMS nodes.

The current standard specifications in OMA and 3rd Generation Partnership Project (3GPP) does not specify how to find out which XDMS node, out of several XDMS nodes in the network, a user is allocated to. However a method referred to as "trial and error" may be used for this purpose. The trial and error method works as follows:

The user sends an XCAP request from an XDMC to an AP. If the AP doesn't find the user in its local storage it forwards the XCAP request to the first XDMS node. If the user is not allocated to the first XDMS node, the AP will receive an error response. The AP will proceed and forward the XCAP request to the second XDMS node. If the user is not allocated to the second XDMS node, the AP will again receive an error response. The AP will then continue to forward the XCAP request until it receives a successful response from the XDMS node where the user is actually allocated. It will then cache the user in its local storage. Next time the AP receives an XCAP request from this user, it will check its local storage and directly find out which XDMS node the user is allocated to, and it will then forward the XCAP request directly to that XDMS node.

A drawback with the "trial and error method" is that it causes a lot of signaling since many messages may be sent before the correct XDMS node is found. In addition, in case of a restart, the AP may need to go through the trial and error procedure from the beginning again in order to find the correct XDMS node, since a restart may cause the local storage of the AP to be cleared.

SUMMARY

It is an object of the invention to address at least some of the issues above. In particular, it is an object to provide an improved solution of finding out which XDMS node a specific user is allocated to in a network with several XDMS nodes. These objects and others may be obtained by using methods and apparatuses according to the attached independent claims.

According to different aspects, methods and apparatuses are provided for routing an XCAP request from an XDM client, via an HTTP Proxy, to an XDM server allocated to a user associated with the XDM client.

According to one aspect, a method is provided for routing an XCAP request from an XDM client, via an HTTP Proxy, to an XDM server allocated to a user associated with the XDM client. Upon receiving the XCAP request from the XDM client, the HTTP proxy checks if the user exists in a storage associated with the HTTP Proxy, based on user information received in the XCAP request. If the HTTP proxy does not find the user in the storage, it creates a SIP request, includes the user information, and sends the SIP request to a SIP proxy. The HTTP proxy then receives a SIP response from the SIP Proxy. The SIP response includes address information identifying the XDM server allocated to the user. The HTTP proxy then routes the XCAP request to the XDM server allocated to the user, based on the received address information.

Furthermore, an HTTP proxy is provided for routing an XCAP request from an XDM client, via the HTTP Proxy, to an XDM server allocated to a user associated with the XDM client. The HTTP proxy comprises a receiver for receiving the XCAP request, including user information, from the XDM client. The HTTP proxy further comprises processing logic configured to checking if the user exists in a storage associated with the HTTP Proxy, based on the user information. The processing logic is further configured to creating a SIP request including the user information. The HTTP proxy further comprises a transmitter for sending the SIP request to a SIP Proxy. The receiver is further configured to receiving a SIP response from the SIP Proxy, including address information identifying the XDM server allocated to the user. The transmitter is further configured to sending the XCAP request to the XDM server allocated to the user, based on the received address information.

An advantage with a method and HTTP proxy as described above is that the correct XDM server may be found in a resource effective way since a small amount of signaling is required.

According to another aspect, a method is provided for routing an XCAP request from an XDM client, via an HTTP Proxy, to an XDM server allocated to a user associated with the XDM client. The XDM server receives a SIP request, including user information, from a SIP Proxy communicating with the HTTP Proxy. The XDM server creates and sends a SIP response to the SIP Proxy communicating with the HTTP Proxy. The SIP response includes address information identifying the XDM server. The HTTP proxy is thereby enabled to route the XCAP request to the XDM server, based on the received address information. Finally the XDM server receives the XCAP request.

Furthermore, an XDM server is provided for use in routing an XCAP request from an XDM client, via an HTTP Proxy, to the XDM server. The XDM server is allocated to a user associated with the XDM client. The XDM server comprises a receiver for receiving a SIP request, including user information, from a SIP Proxy communicating with the HTTP Proxy. The XDM server further comprises processing logic configured to creating a SIP response, including address information identifying the XDM server. The XDM server also comprises a transmitter for sending the SIP response to the SIP Proxy communicating with the HTTP Proxy. The HTTP Proxy is thereby enabled to route the XCAP request to the XDM server, based on the received address information. Further, the XDM server comprises a receiver for receiving the XCAP request.

An advantage with a method and XDM server as described above is that the correct XDM server may be found in a resource effective way since a small amount of signaling is required.

According to another aspect, a method is provided for routing an XCAP request from an XDM client, via an HTTP Proxy, to an XDM server allocated to a user associated with the XDM client. A SIP proxy communicating with the HTTP Proxy receives a SIP request, including user information, from the HTTP proxy. The SIP proxy then retrieves address information identifying the XDM server allocated to the user, from a subscriber database, by using the received user information. Finally the SIP proxy sends a SIP response to the HTTP Proxy. Since the SIP response includes address information identifying the XDM server allocated to the user, the HTTP Proxy is thereby enabled to route the XCAP request to the XDM server, based on the received address information.

Furthermore, a SIP proxy is provided for use in routing an XCAP request from an XDM client, via an HTTP Proxy, to an XDM server allocated to a user associated with the XDM client. The SIP proxy comprises a receiver configured to receiving a SIP request, including user information, from the HTTP Proxy. The SIP proxy further comprises a retrieving unit configured to retrieve address information identifying the XDM server allocated to the user, from a subscriber database, using the received user information. The SIP proxy also comprises a transmitter for sending a SIP response to the HTTP Proxy. Since the SIP response includes address information identifying the XDM server allocated to the user, the HTTP Proxy is thereby enabled to route the XCAP request to the XDM server, based on the received address information.

An advantage with such a method and SIP proxy is that it further reduces the signaling that is required in order to find the XDM server allocated to the user.

Further features of the invention and its benefits will become apparent from the detailed description below.

BRIEF DESCRIPTION OF THE DRAWINGS

The invention will now be described in more detail by means of exemplary embodiments and with reference to the accompanying drawings, in which.

DETAILED DESCRIPTION

Figure 1:
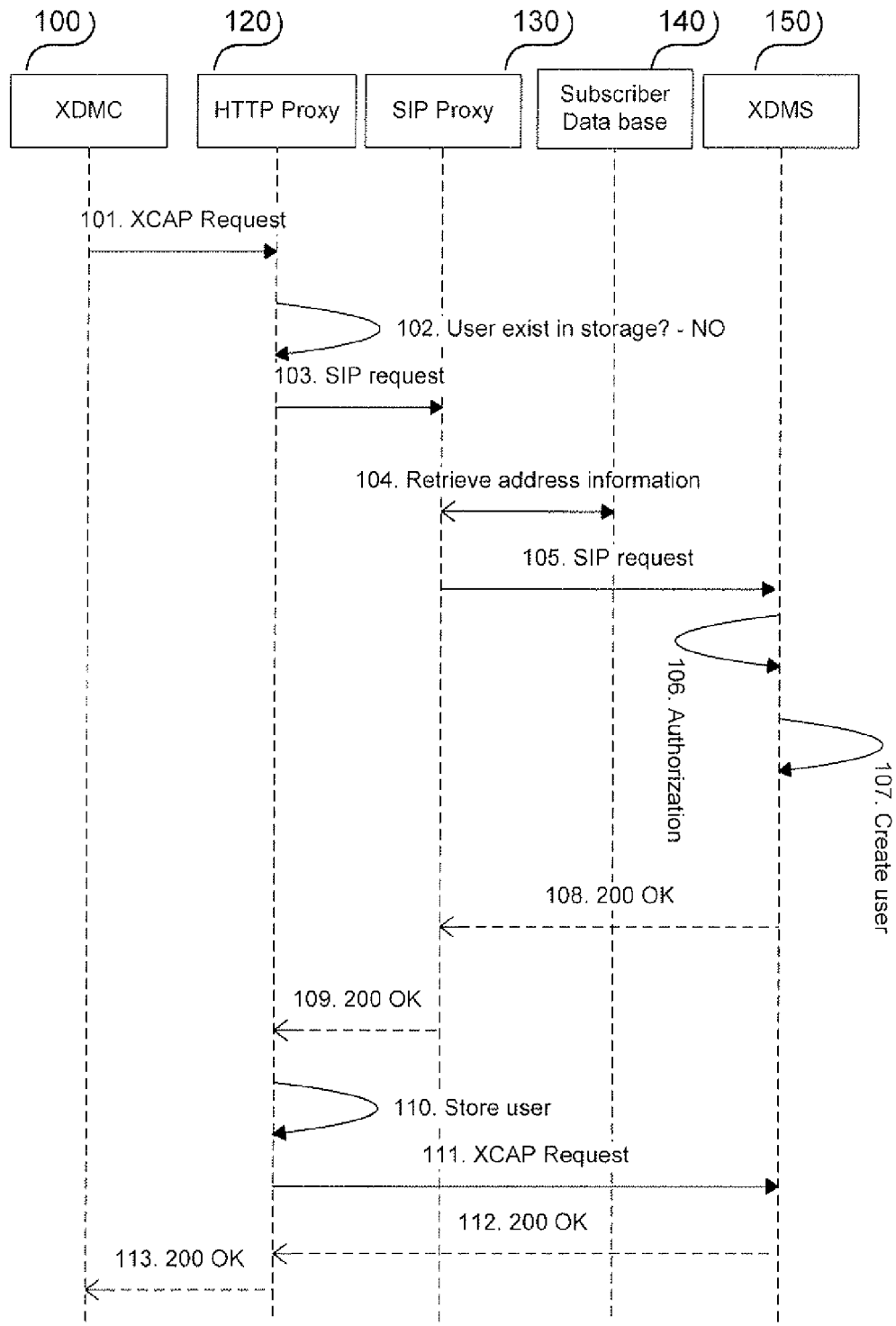
FIG. 1 is a signalling diagram schematically illustrating a procedure for routing an XCAP request to an XDM server, in accordance with an embodiment of the invention.

It has been discussed above how a "trial and error method" can be used in order to find out which XDMS node, out of several XDMS nodes in the network, a user is allocated to.

A pre-condition for using the above described "trial and error method" is that the user is provisioned into an XDMS node. This means that the "trial and error method" is not compatible with Auto Provisioning. With Auto Provisioning the user is not provisioned into an XDMS node until the user sends its first request.

Briefly described, a solution is provided for enabling an effective way of finding out which XDMS node a user is allocated to. The suggested solution is compatible with Auto-Provisioning since it does not require the user to be provisioned into an XDMS node. When an HTTP proxy receives an XCAP request from an XDM client, it will create a SIP request by extracting user identifying information from the XDM request, and then include the user information into the SIP request. The HTTP proxy will then send the SIP request to a SIP proxy. Upon receiving the SIP request, the SIP Proxy will find out which XDM server the user is allocated to by enquiring a subscriber database. In one embodiment the SIP proxy will forward the SIP request to the XDM server allocated to the user, and then the XDM server will include its address in a SIP response to the SIP proxy. The SIP proxy then forwards the SIP response, including the XDM server address to the HTTP proxy. In another embodiment the SIP proxy will respond directly to the HTTP proxy by including the XDM server address in a SIP response. After having received the SIP response, the HTTP Proxy will, according to both above described embodiments, be able to route the XCAP request to the correct XDM server.

In this description the term "XDM server" is hereinafter used to represent an XDMS node or XDMS.

Throughout this description the expression "an XDM server allocated to a user" is used. As discussed above, the solution does not require the user to be provisioned into an XDM server. Consequently it is sufficient that the user is provisioned into a subscriber database, i.e. the subscriber database contains information about which XDM server a user is allocated to.

The term "HTTP proxy" is used to represent an HTTP proxy server, such as the above described AP. A general description of a proxy server is that it acts as an intermediary for requests from clients seeking resources from other servers. The storage associated with the HTTP proxy may be a memory or a database.

The term "SIP proxy" is used to represent a Session Initiation Protocol (SIP) proxy server, such as a Call Session Control Function (CSCF). The IMS network comprises various CSCF's, such as Proxy CSCF (P-CSCF), Serving CSCF (S-CSCF), and Interrogating CSCF (I-CSCF). A Session Border Gateway (SBG) is another example of a SIP proxy.

The term "subscriber database" is used to represent a database, containing information about users, such as subscriber and authentication data which can be retrieved by other nodes for serving and handling different clients. A subscriber database may e.g. contain information about which XDM server a specific user is allocated to. A Home Subscriber Server (HSS) is an example of a subscriber database used in e.g. IMS and Long Term Evolution (LTE). A Home Location Register (HLR) is an example of a subscriber database used in e.g. Global System for Mobile Communications (GSM) and General Packet Radio Service (GPRS). An application server might have its own subscriber database.

The term "user information" is used to represent information identifying a user. A SIP Uniform Resource Identifier (URI) (e.g. sip:user@domain.com) identifies a communications resource, such as a user, and is defined in RFC 3261. An example of a SIP URI is a Public User Identity (PUI) i.e. the public address of an IMS user. Another example of a SIP URI is a Public Service Identity (PSI) i.e. the identity of an IMS service. A TEL URI (e.g. tel:+461234567) describes resources identified by telephone numbers, and is defined in RFC 3966. The user information may be a SIP URI or a TEL URI.

The SIP response, including the address information identifying the XDM server, may be any SIP response, but preferably a successful response such as 200 OK, or any 2xx message. The address information identifying the XDM server may be carried in a header or in a body of the SIP response.

A procedure for routing an XCAP request from an XDM client to an XDM server allocated to a user associated with the XDM client, in accordance with one embodiment, will now be described with reference to the signaling diagram shown in FIG. 1. A first step 101 illustrates that an HTTP proxy 120 receives the XCAP request from the XDM client 100. The XCAP request includes user information. Step 102 illustrates that the HTTP proxy checks if the user exists in a storage associated with the HTTP proxy, based on the received user information. The HTTP proxy may authenticate the user in connection with step 102. If the user exists in the storage, then the HTTP proxy will directly send the XCAP request to the XDM server 150 allocated to the user, as illustrated in step 111. If the user does not exist in the storage, then the HTTP proxy creates and sends a SIP request to a SIP proxy 130, and includes the user information into the SIP request, as illustrated in step 103. The SIP request may be a SIP SUBSCRIBE or a SIP OPTIONS or any other SIP request. The SIP proxy then retrieves, as illustrated in step 104, address information identifying the XDM server allocated to the user, from a subscriber database 140, using the user information received in the SIP request. Step 105 illustrates that the SIP proxy forwards the SIP request to the XDM server allocated to the user. The XDM server may authorize the request, as illustrated in step 106, and may then create default data for the user, as illustrated in step 107, based on the user information received in the SIP request. Step 108 illustrates that the XDM server creates and sends a SIP response, including address information identifying the XDM server, to the SIP proxy. The SIP proxy forwards the SIP response, including the address information identifying the XDM server, to the HTTP proxy, as illustrated in step 109. Step 110 illustrates that the HTTP proxy may store the user in the storage, associated with the HTTP proxy, after having received the SIP response from the SIP proxy. Step 111 illustrates that the HTTP proxy routes the XCAP request to the XDM server allocated to the user, based on the received address information. The XDMS may then go ahead and process the XCAP request and may send a response to the HTTP proxy, as illustrated in step 112. The HTTP proxy may then forward the response to the XCAP client, as illustrated in step 113. The next time the HTTP proxy receives an XCAP request associated with the same user, it may find the user in the storage and thus be able to send the XCAP request directly to the XDM server allocated to the user without having to go through steps 103-110.

A procedure for routing an XCAP request from an XDM client to an XDM server, in accordance with another embodiment, will now be described with reference to the signaling diagram shown in FIG. 2. A first step 201 illustrates that an HTTP proxy 120 receives the XCAP request from the XDM client 100. The XCAP request includes user information related to a user associated with the XDM client. Step 202 illustrates that the HTTP proxy checks if the user exists in a storage associated with the HTTP proxy, based on the received user information. If the user exists in the storage, then the HTTP proxy will directly send the XCAP request to the XDM server 250 allocated to the user, as illustrated in step 207. If the user does not exist in the storage, then the HTTP proxy creates and sends a SIP request to a SIP proxy 230, and includes the user information into the SIP request, as illustrated in step 203. The SIP request may be a SIP MESSAGE or a SIP OPTIONS or any other SIP request. The SIP proxy then retrieves, as illustrated in step 204, address information identifying the XDM server allocated to the user, from a subscriber database 140, using the user information received in the SIP request. Step 205 illustrates that the SIP proxy sends a SIP response to the HTTP proxy, including address information identifying the XDM server. In contrast to the embodiment described in connection with FIG. 1, the SIP proxy acts User Agent Server and responds directly with the address information, without first querying the XDM server. Step 206 illustrates that the HTTP proxy may store the user in the storage, associated with the HTTP proxy, after having received the SIP response from the SIP proxy. Step 207 illustrates that the HTTP proxy routes the XCAP request to the XDM server allocated to the user, based on the received address information. The XDM server may authorize the request, as illustrated in step 208, and may then create default data for the user, as illustrated in step 209. The XDMS may then go ahead and process the XCAP request and may send a response to the HTTP proxy, as illustrated in step 210. The HTTP proxy may then forward the response to the XCAP client, as illustrated in step 211. The next time the HTTP proxy receives an XCAP request associated with the same user, it may find the user in the storage and thus be able to send the XCAP request directly to the XDM server allocated to the user without having to go through steps 203-206.

Figure 3:
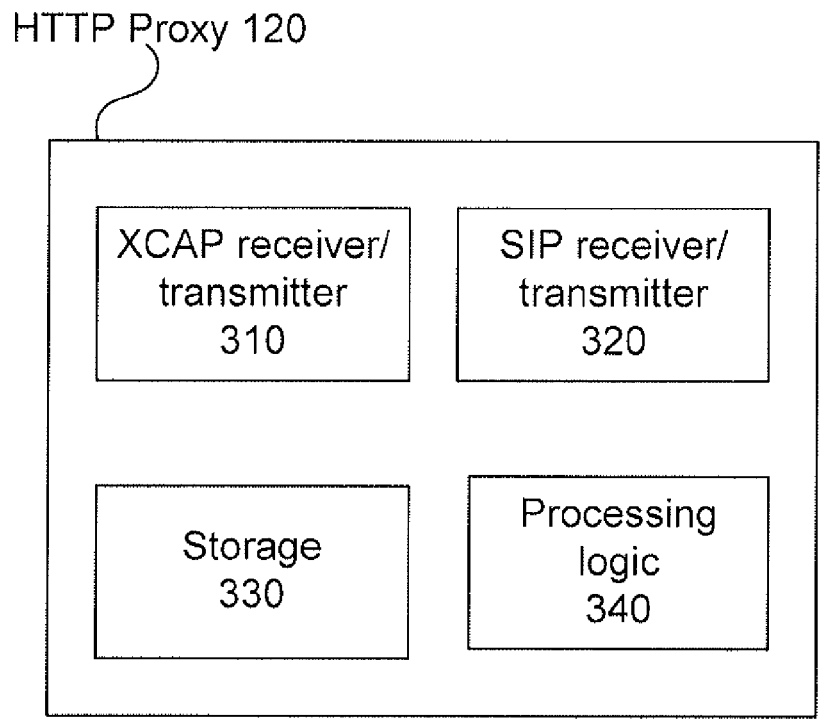
FIG. 3 is a block diagram schematically illustrating an HTTP Proxy, in accordance with embodiments of the invention.

FIG. 3 is a block diagram of exemplary components of HTTP Proxy 120. As illustrated, HTTP Proxy 120 comprises an XCAP receiver/transmitter 310, a SIP receiver/transmitter 320, processing logic 340 and storage 330. XCAP receiver/transmitter 310 may comprise circuitry that allows HTTP proxy 120 to communicate with other nodes in the network which also are able to handle XCAP messages. In particular, XCAP receiver/transmitter 310 is configured to receiving XCAP requests from XDMS clients, the XCAP requests including user information, and for sending the XCAP requests to XDM servers allocated to users, based on received address information. SIP receiver/transmitter 320 may comprise circuitry that allows HTTP proxy 120 to communicate with other nodes in the network which also are able to handle SIP messages. In particular, SIP receiver/transmitter 320 is configured to sending SIP requests to SIP proxies, and to receiving SIP responses from SIP proxies, including address information. Storage 330 may be a memory or a database, and includes information regarding users and address information about XDM servers allocated to users. Processing logic 340 may control the operation of HTTP proxy 120. In particular, processing logic 340 is configured to checking if a user exists in storage 330, based on user information, and to creating a SIP request including user information. Although FIG. 3 shows exemplary components of the HTTP proxy 120, in other implementations, the HTTP proxy may contain fewer, different, or additional components than those described above. In still other implementations, one or more components of the HTTP proxy may perform the tasks described as being performed by one or more other components of the HTTP proxy.

Figure 4:
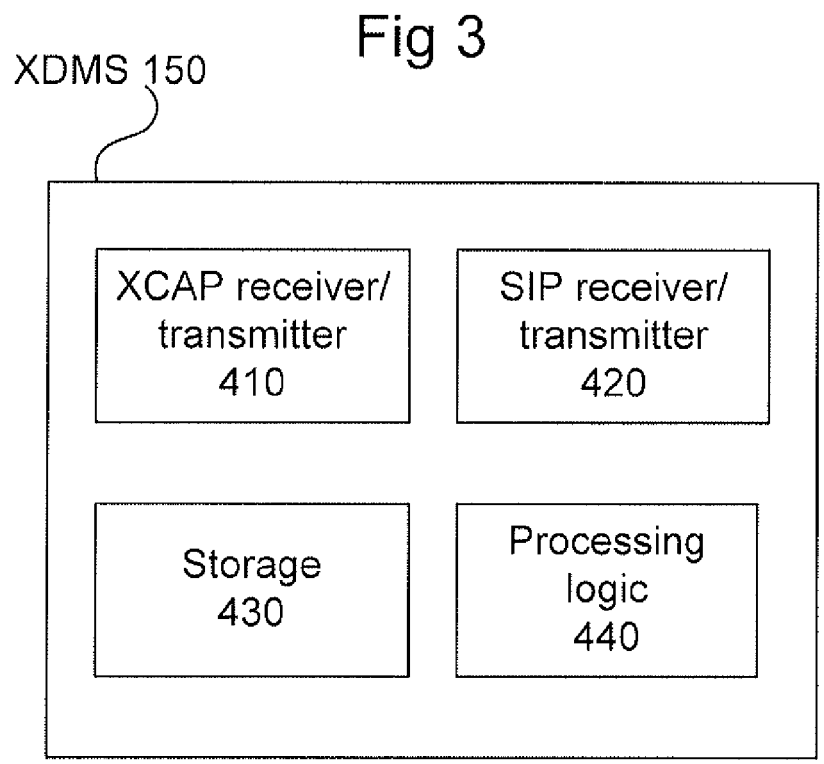
FIG. 4 is a block diagram schematically illustrating an XDM server, in accordance with embodiments of the invention.

FIG. 4 is a block diagram of exemplary components of XDM server 150. As illustrated, XDM server 150 may comprise an XCAP receiver/transmitter 410, a SIP receiver/transmitter 420, processing logic 440 and storage 430. SIP receiver/transmitter 420 may comprise circuitry that allows XDM server 150 to communicate with other nodes in the network which also are able to handle SIP messages. In particular, SIP receiver/transmitter 420 is configured to receiving SIP requests from SIP proxies, including user information, and to sending SIP responses to SIP proxies. XCAP receiver/transmitter 410 may comprise circuitry that allows XDM server 150 to communicate with other nodes in the network which also are able to handle XCAP messages. In particular, XCAP receiver/transmitter 410 is configured to receiving XCAP requests. Storage 430 may be a memory or a database, and may include information regarding users. Processing logic 440 may control the operation of XDM server 150. In particular, processing logic 440 is configured to creating SIP responses including address information identifying the XDM server 150. Although FIG. 4 shows exemplary components of the XDM server 150, in other implementations, the XDM server may contain fewer, different, or additional components than those described above. In still other implementations, one or more components of the XDM server may perform the tasks described as being performed by one or more other components of the XDM server.

Figure 5:
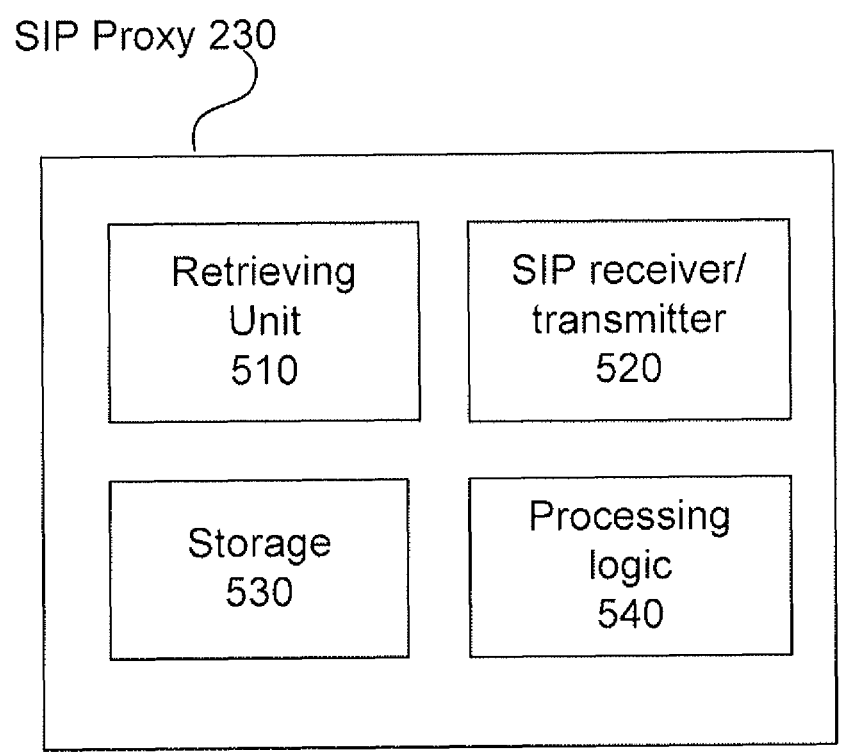
FIG. 5 is a block diagram schematically illustrating a SIP Proxy, in accordance with embodiments of the invention.

FIG. 5 is a block diagram of exemplary components of SIP proxy 230. As illustrated, SIP proxy 230 may comprise a SIP receiver/transmitter 520, a retrieving unit 510, processing logic 540 and storage 530. SIP receiver/transmitter 520 may comprise circuitry that allows SIP proxy 230 to communicate with other nodes in the network which also are able to handle SIP messages. In particular, SIP receiver/transmitter 520 is configured to receiving SIP requests from HTTP proxies, including user information, and to sending SIP responses to HTTP proxies. Retrieving unit 510 is configured to retrieving address information related to XDM servers allocated to users from subscriber databases. Storage 530 may be a memory or a database, and may include information regarding users and address information about XDM servers allocated to users. Processing logic 540 may control the operation of SIP proxy 230. Although FIG. 5 shows exemplary components of the SIP proxy 230, in other implementations, the SIP proxy may contain fewer, different, or additional components than those described above. In still other implementations, one or more components of the SIP proxy may perform the tasks described as being performed by one or more other components of the SIP proxy.

Figure 6:
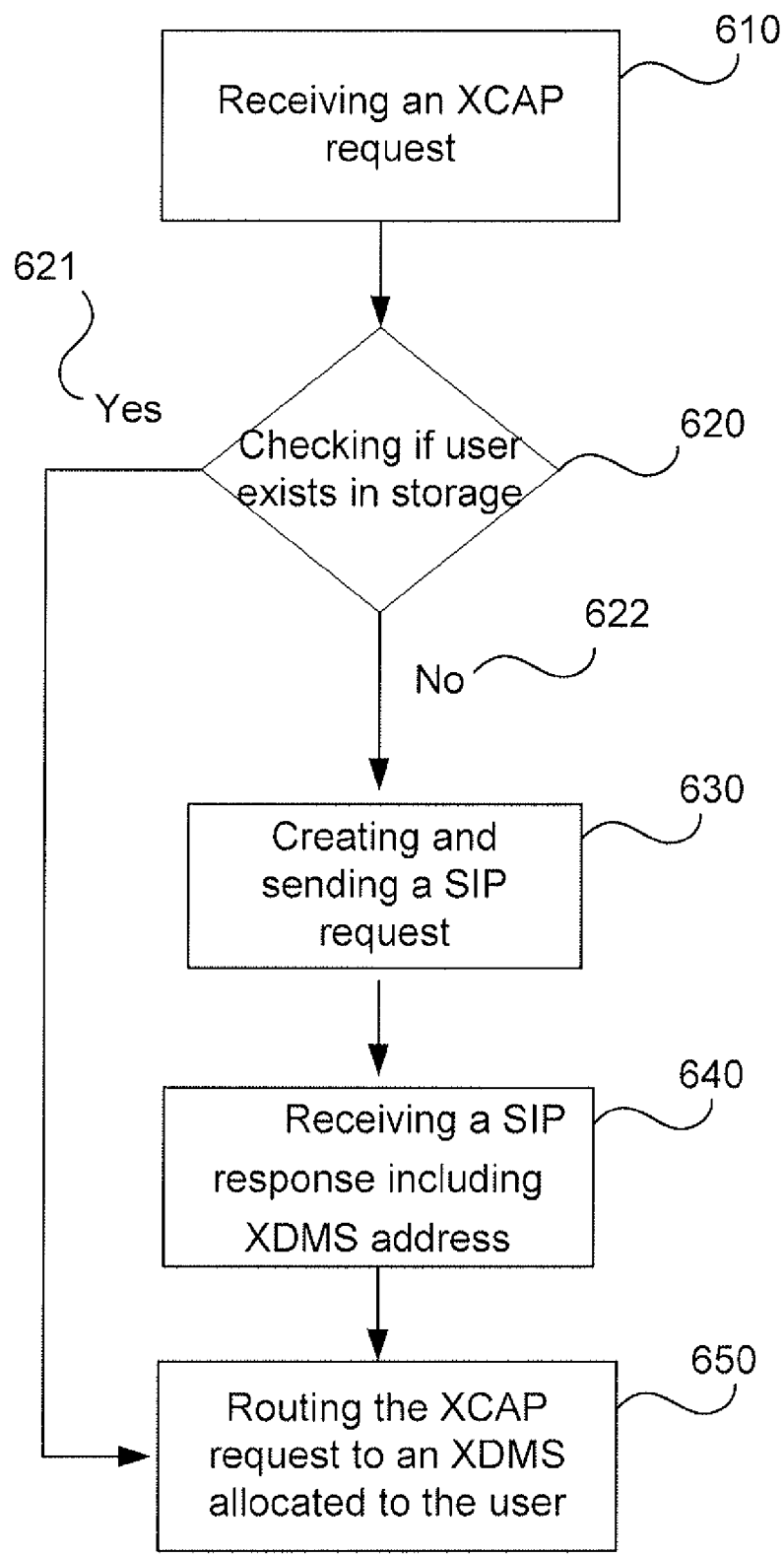
FIG. 6 is a flow chart schematically illustrating a procedure executed by an HTTP proxy for routing an XCAP request to an XDM server, in accordance with embodiments of the invention.

A procedure executed by an HTTP proxy for routing an XCAP request from an XDM client, via the HTTP proxy, to an XDM server allocated to a user associated with the XDM client, in accordance with embodiments of the invention, will now be described with reference to the flow chart shown in FIG. 6. In a first step 610, the HTTP proxy 120 receives an XCAP request from the XDM client 100. The XCAP request includes user information. Step 620 illustrates that the HTTP proxy checks if the user exists in a storage associated with the HTTP proxy, based on the received user information. If the user exists in the storage, then the HTTP proxy will directly send the XCAP request to the XDM server 150, 250 allocated to the user, as illustrated in step 621. If the user does not exist in the storage, as illustrated in step 622, then the HTTP proxy creates and sends a SIP request to a SIP proxy 130, 230, by including the user information, extracted from the XCAP request, into the SIP request, as illustrated in step 630. According to one embodiment the SIP request may be a SIP SUBSCRIBE or a SIP OPTIONS or any other SIP request. According to another embodiment the SIP request may be a SIP MESSAGE or a SIP OPTIONS or any other SIP request. As illustrated in step 640, the HTTP proxy receives a SIP response, including address information identifying the XDM server allocated to the user, from the SIP proxy. The HTTP proxy may store the user in the storage, associated with the HTTP proxy, after having received the SIP response from the SIP proxy. Step 650 illustrates that the HTTP proxy routes the XCAP request to the XDM server allocated to the user, based on the received address information.

Figure 7:
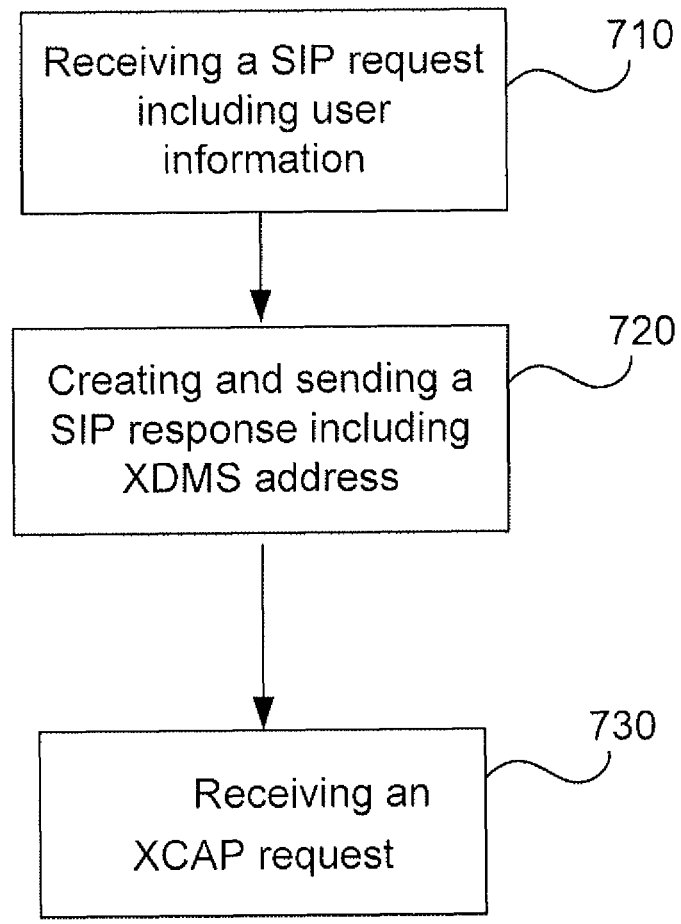
FIG. 7 is a flow chart schematically illustrating a procedure executed by an XDM server for routing an XCAP request to the XDM server, in accordance with embodiments of the invention.

A procedure executed by an XDM server for routing an XCAP request from an XDM client, via an HTTP proxy, to the XDM server, the XDM server being allocated to a user associated with the XDM client, in accordance with embodiments of the invention, will now be described with reference to the flow chart shown in FIG. 7. In a first step 710 the XDM server 150 receives a SIP request from a SIP proxy 130. The SIP request may be a SIP SUBSCRIBE. The SIP request includes user information. Step 720 describes that the XDM server creates and sends a SIP response, including address information identifying the XDM server, to the SIP Proxy. The SIP response may then be forwarded to an HTTP proxy, thereby enabling the HTTP Proxy to route the XCAP request to the XDM server, based on the received address information. As illustrated in step 730, the XDM server then receives the XCAP request.

Figure 8:
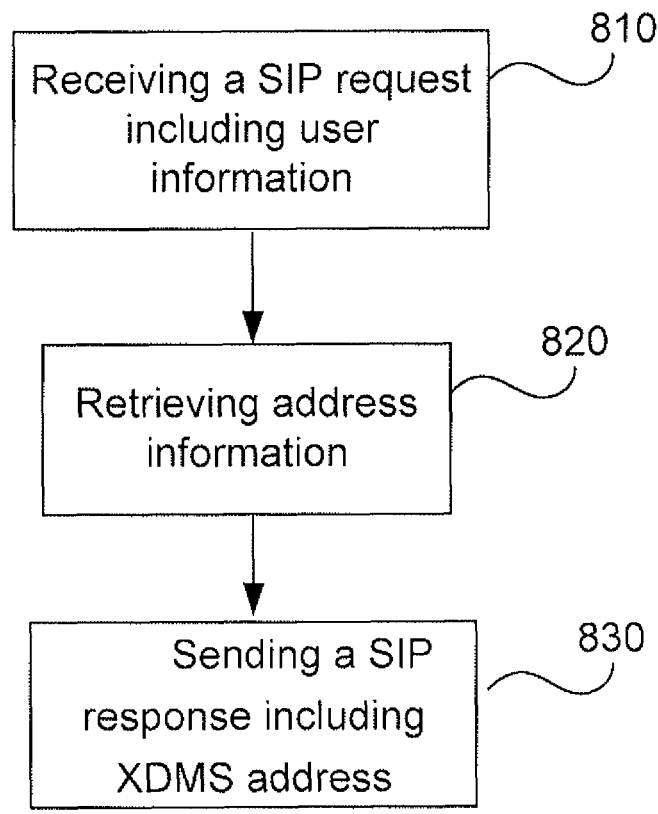
FIG. 8 is a flow chart schematically illustrating a procedure executed by a SIP proxy for routing an XCAP request to an XDM server, in accordance with embodiments of the invention.

A procedure executed by a SIP proxy for routing an XCAP request from an XDM client, via an HTTP proxy, to an XDM server allocated to a user associated with the XDM client, in accordance with embodiments of the invention, will now be described with reference to the flow chart shown in FIG. 8. In a first step the SIP proxy 230 receives a SIP request from the HTTP proxy 120. The SIP request includes user information. The SIP request may be a SIP MESSAGE or a SIP OPTIONS or any other SIP request. Step 820 describes that the SIP proxy retrieves address information identifying the XDM server 250, from a subscriber database 140, using the received user information. Step 830 describes that the SIP proxy sends a SIP response, including address information identifying the XDM server, directly to the HTTP Proxy, without first querying the XDM server, thereby enabling the HTTP Proxy to route the XCAP request to the XDM server, based on the received address information.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of routing an Extensible Markup Language (XML) Configuration Access Protocol(XCAP) request from an XML Document Management (XDM) client, via an Hyper Text Transfer Protocol (HTTP) Proxy, to an XDM server allocated to a user associated with the XDM client, wherein the HTTP Proxy performs the steps of:
   receiving the XCAP request from the XDM client, the XCAP request including user information associated with the user;
   checking if address information identifying an XDM server allocated to the user exists in a storage associated with the HTTP Proxy, based on the user information; and
   in response to determining that the address information identifying an XDM server allocated to the user does not exist in the storage associated with the HTTP Proxy:
   (i) creating and sending a Session Initiation Protocol (SIP) request to a SIP Proxy, the SIP request including the user information, wherein the SIP Proxy uses the user information from the SIP request to access a subscriber database that includes information about which XDM server from a plurality of XDM servers that is allocated to the user and obtain address information identifying the XDM server allocated to the user;
   (ii) receiving a SIP response from the SIP Proxy, including address information identifying the XDM server allocated to the user;
   (iii) storing the address information in the storage associated with the HTTP Proxy;
   (iv) routing the XCAP request to the XDM server allocated to the user, based on the received address information;
   (v) receiving an XCAP response from the XDM server allocated to the user; and
   (vi) forwarding the XCAP response to the XDM client.

2. The method according to claim 1, further comprising:
   in response to receiving a second XCAP request after receiving the SIP response from the SIP Proxy, routing the second XCAP request to the XDM server using the stored address information.

3. The method according to claim 2, further comprising:
   receiving an acknowledgement message from the XDM server in response to the routed second XCAP request.

4. The method according to claim 1, wherein the user information is a SIP URI or a TEL URI.

5. The method according to claim 1, wherein the address information identifying the XDM server is carried in a header of the SIP response.

6. The method according to claim 1, wherein the address information identifying the XDM server is carried in a body of the SIP response.

7. A method of routing an Extensible Markup Language (XML) Configuration Access Protocol(XCAP) request from an XML Document Management, XDM, client, via an Hyper Text Transfer Protocol(HTTP) Proxy, to an XDM server allocated to a user associated with the XDM client, wherein the XDM server performs the steps of:
   receiving a Session Initiation Protocol (SIP) request, including user information from a SIP Proxy communicating with the HTTP Proxy, wherein:
   the HTTP proxy originated the SIP request to include the user information, in response to receiving the XCAP request from the XDM client, and the SIP Proxy obtained the address information for the XDM server from a subscriber database that includes information about which XDM server from a plurality of XDM servers that is allocated to the user;
   authorizing the user information included in the SIP request;
   creating and sending a SIP response, including address information identifying the XDM server to the SIP Proxy communicating with the HTTP Proxy, thereby enabling the HTTP proxy to store the address information in the storage associated with the HTTP proxy, and enabling the HTTP Proxy to route the XCAP request to the XDM server, based on the received address information;
   receiving the XCAP request from the HTTP proxy; the XCAP request including user information associated with the user; and
   sending an XCAP response to the HTTP proxy, enabling the HTTP proxy to forward the XCAP response to the XDM client associated with the user information.

8. The method according to claim 7, wherein the XDM server performs the further step of:
   creating default data for the user based on the user information received from the SIP request.

9. An XML Document Management (XDM) server for use in routing an Extensible Markup Language (XML) Configuration Access Protocol (XCAP) request from an XDM client, via an Hyper Text Transfer Protocol (HTTP) Proxy, to the XDM server, the XDM server being allocated to a user associated with the XDM client, the XDM server comprising:
   one or more receivers;
   one or more transmitters; and
   one or more processors for:
   utilizing the one or more receivers to receive a Session Initiation Protocol (SIP) request, including user information, from a SIP Proxy communicating with the HTTP Proxy, wherein:
   the HTTP proxy originated the SIP request to include the user information, in response to receiving the XCAP request from the XDM client, and the SIP Proxy obtained the address information for the XDM server from a subscriber database that includes information about which XDM server from a plurality of XDM servers that is allocated to the user;
   authorizing the user information included in the SIP request;
   creating a SIP response, including address information identifying the XDM server, in response to the receipt of the SIP request;
   utilizing the one or more transmitters to transmit the SIP response to the SIP Proxy communicating with the HTTP Proxy, thereby enabling the HTTP proxy to store the address information in the storage associated with the HTTP proxy, and enabling the HTTP Proxy to route the XCAP request to the XDM server, based on the received address information;
   utilizing the one or more receivers to receive the XCAP request from the HTTP proxy, the XCAP request including user information associated with the user; and
   utilizing the one or more transmitters to transmit an XCAP response to the HTTP proxy, enabling the HTTP proxy to forward the XCAP response to the XDM client associated with the user information.

10. The XDM server to claim 9, wherein the one or more processors is further utilized for:

creating default data for the user information based on the user information received from the SIP request.

11. An Hyper Text Transfer Protocol (HTTP) Proxy server for use in routing an Extensible Markup Language (XML) Configuration Access Protocol (XCAP) request from an XML Document Management (XDM) client, via the HTTP Proxy, to an XDM server allocated to a user associated with the XDM client, the HTTP Proxy server comprising:
one or more receivers;
one or more transmitters; and
one or more processors for:
utilizing the one or more receivers to receive the XCAP request from the XDM client, the XCAP request including user information;
determining if address information identifying an XDM server allocated to the user exists in a storage associated with the HTTP Proxy, based on the user information; and in response to determining that the address information identifying an XDM server allocated to the user does not exist in the storage associated with the HTTP proxy creating a Session Initiation Protocol (SIP) request including the user information;
utilizing the one or more transmitters to transmit the SIP request to a SIP Proxy, wherein the SIP Proxy uses the user information from the SIP request to access a subscriber database that includes information about which XDM server from a plurality of XDM servers that is allocated to the user and obtain address information identifying the XDM server allocated to the user;
utilizing the one or more receivers to receive a SIP response from the SIP Proxy, including address information identifying the XDM server allocated to the user;
storing the address information in the storage associated with the HTTP proxy;
utilizing the one or more transmitters to send the XCAP request to the XDM server allocated to the user, based on the received address information;
utilizing the one or more receivers to receive an XCAP response from the XDM server allocated to the user; and
utilizing the one or more transmitters to forward the XCAP response to the XDM client.

12. A method of routing an Extensible Markup Language (XML) Configuration Access Protocol (XCAP) request from an XML Document Management (XDM) client, via an Hyper Text Transfer Protocol (HTTP) Proxy, to an XDM server allocated to a user associated with the XDM client, wherein a Session Initiation Protocol (SIP) Proxy communicating with the HTTP Proxy performs the steps of:
receiving a SIP request, including user information, from the HTTP Proxy, wherein the user information in the SIP request originated from an XCAP request sent by the XDM client to the HTTP server;
retrieving address information identifying the XDM server allocated to the user, from a subscriber database that includes information about which XDM server from a plurality of XDM servers that is allocated to the user, using the received user information; and
sending a SIP response, including address information identifying the XDM server, to the HTTP Proxy, thereby enabling the HTTP Proxy to store the address information in the storage associated with the HTTP proxy and to route the XCAP request originating from the XDM client to the XDM server, based on the received address information, wherein enabling the XDM Server to send an XCAP response to the HTTP proxy, further enabling the HTTP proxy to forward the XCAP response to the XDM client associated with the user information.

13. A Session Initiation Protocol (SIP) Proxy server for use in routing an Extensible Markup Language (XML) Configuration Access Protocol (XCAP) request from an XML Document Management (XDM) client, via an Hyper Text Transfer Protocol (HTTP) Proxy, to an XDM server allocated to a user associated with the XDM client, the SIP Proxy server comprising:
one or more receivers;
one or more transmitters; and
one or more processors for:
utilizing the one or more receivers to receive a SIP request, including user information, from the HTTP Proxy, wherein the user information in the SIP request originated from an XCAP request sent by the XDM client to the HTTP server;
retrieving address information identifying the XDM server allocated to the user, from a subscriber database that includes information about which XDM server from a plurality of XDM servers that is allocated to the user using the received user information; and
utilizing the one or more transmitters to transmit a SIP response, including address information identifying the XDM server allocated to the user, to the HTTP Proxy, thereby enabling the HTTP Proxy to store the address information in the storage associated with the HTTP proxy and route the XCAP request originating from the XDM client to the XDM server, based on the received address information, wherein enabling the XDM Server to send an XCAP response to the HTTP proxy, further enabling the HTTP proxy to forward the XCAP response to the XDM client associated with the user information.

* * * * *

UNITED STATES PATENT AND TRADEMARK OFFICE
CERTIFICATE OF CORRECTION

PATENT NO.        : 9,332,055 B2
APPLICATION NO.   : 13/576588
DATED             : May 3, 2016
INVENTOR(S)       : Gecer et al.

It is certified that error appears in the above-identified patent and that said Letters Patent is hereby corrected as shown below:

On the title page

Item (75), under "Inventors", in Column 1, Line 1, delete "Saltsjo-Boo," and insert -- Saltsjö-Boo, --, therefor.

On Page 2, Item (56), under "OTHER PUBLICATIONS", in Column 2, Line 1, delete "moblile" and insert -- mobile --, therefor.

In the drawings

Figure 2:
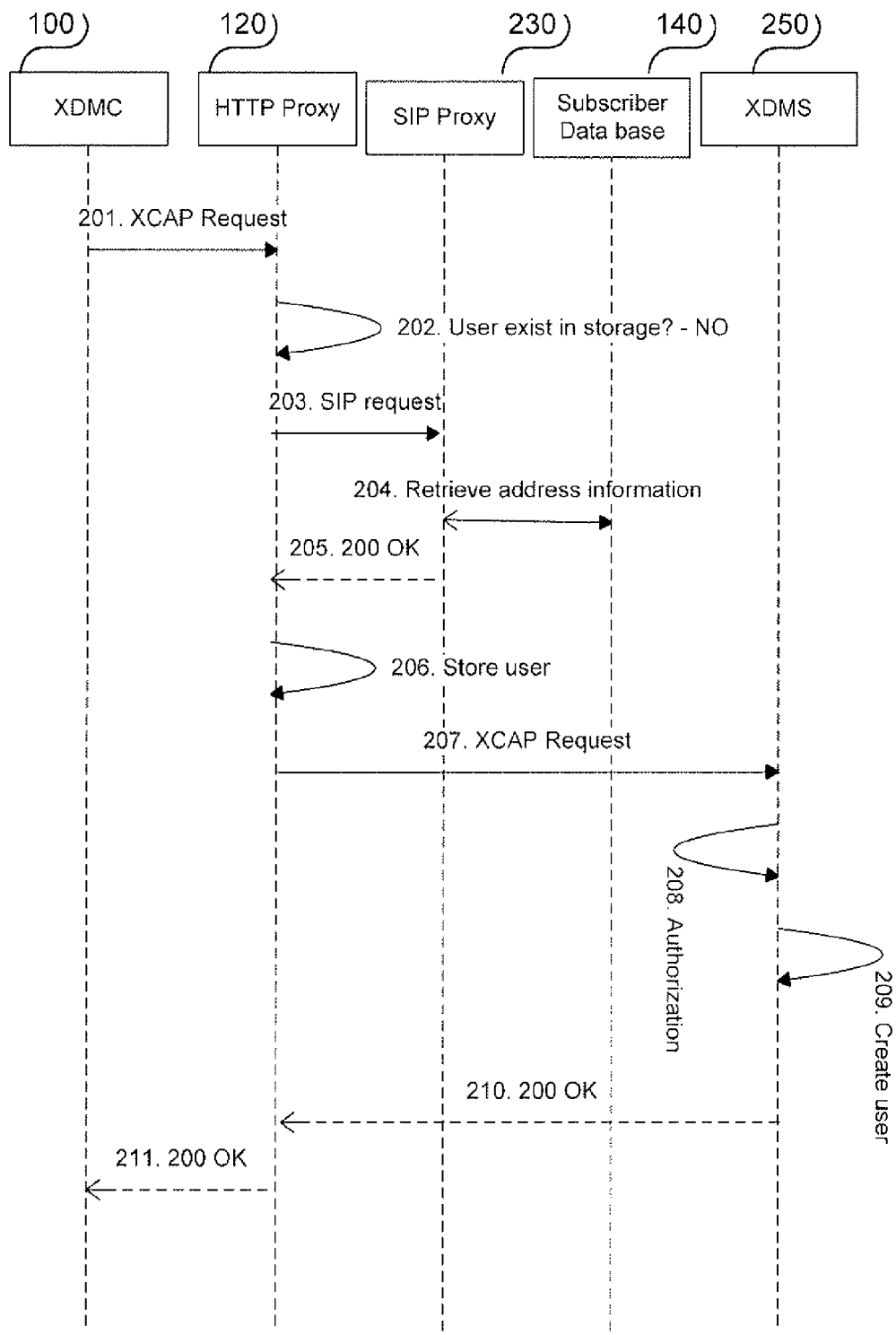
FIG. 2 is a signalling diagram schematically illustrating a procedure for routing an XCAP request to an XDM server, in accordance with another embodiment of the invention.

In Fig. 1, Sheet 1 of 7, delete "Fig" and insert -- Fig. --, therefor at each occurrence throughout the figures.

In the claims

In Column 12, Line 37, in Claim 13, delete "the user" and insert -- the user, --, therefor.

Signed and Sealed this
Nineteenth Day of July, 2016

Michelle K. Lee
*Director of the United States Patent and Trademark Office*